Figure 1:
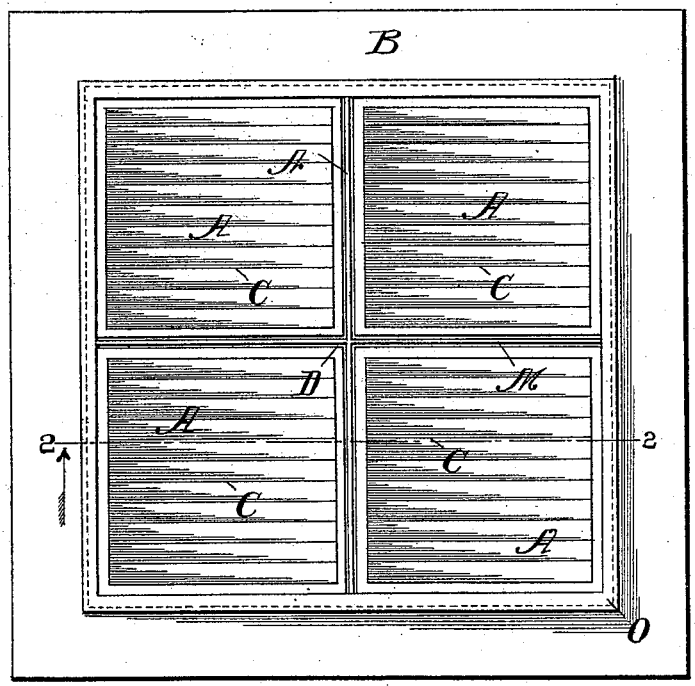

(No Model.) 2 Sheets—Sheet 1.

W. H. WINSLOW.
METHOD OF ELECTROLYTICALLY UNITING GLASS TILES INTO A BODY.

No. 574,843. Patented Jan. 5, 1897.

Witnesses:
J. B. McGinn.
J. P. Appleman.

Inventor:
William H. Winslow
By Thomas W. Parker
Atty.

(No Model.) 2 Sheets—Sheet 2.

W. H. WINSLOW.
METHOD OF ELECTROLYTICALLY UNITING GLASS TILES INTO A BODY.

No. 574,843. Patented Jan. 5, 1897.

Witnesses:
J. B. McGirr.
J. P. Appleman.

Inventor:
William H. Winslow
By Francis W. Parker
Atty.

UNITED STATES PATENT OFFICE.

WILLIAM H. WINSLOW, OF CHICAGO, ILLINOIS.

METHOD OF ELECTROLYTICALLY UNITING GLASS TILES INTO A BODY.

SPECIFICATION forming part of Letters Patent No. 574,843, dated January 5, 1897.

Application filed November 2, 1896. Serial No. 610,818. (No specimens.)

*To all whom it may concern:*

Be it known that I, WILLIAM H. WINSLOW, a citizen of the United States, residing at Chicago, in the county of Cook and State of Illinois, have invented certain Improvements in Processes of and Means for Framing Up Glass and other Tile, of which the following is a specification.

My invention relates to methods for uniting or bringing together a series of tile, particularly glass tile, into a body, so as to make a window or covering for an aperture.

My invention relates to and is applicable to various kinds of glass or tile, but I have particularly illustrated it in connection with prismatic window-glass and vault-lights, which is the particular field at present intended by me to be occupied by this invention so far as it relates thereto.

Prismatic tile or the like commonly consists of glass bodies more or less smooth on one side and provided with inwardly or downwardly projecting ribs or the like on the opposite side. These ribs have faces set so that the rays of light entering will be refracted or reflected, as the case may be, by the inclined walls or faces or surfaces of said ribs.

Referring to the particular kind of tile which is illustrated in the drawings, I would explain that these tiles consist each of a body of glass with a smooth outside surface and inwardly-projecting refracting-ribs, one face of each rib being nearly at right angles to the surface and the other being inclined thereto.

In the preferred form of my device each tile or separate piece of glass has its ribs extending clear to the extremity of the tile in every direction so far as may be possible. The separate sections of glass are to be brought together firmly and held securely in position. This ought to be done with the least possible obstruction of the light, or, in other words, the connecting devices which join the several sections of glass together should be as thin as possible. Again, in the case of prismatic glass the prismatic ribs or projecting parts should cover the greatest possible portion of the inner surface of the tile, for since these ribs tend to distribute the light any break between them, as, for example, by means of ledges which surround the prismatic portion, will of course present a wide surrounding or intervening strip which will not distribute the light. Again, the connection must be such as to make the completed body waterproof and of a nature to resist the action of the atmospheric air. Again, if the complete body of glass or tile is to be of any considerable extent, and particularly if it is to be inclined or laid horizontally, or if the tile are to be made of heavy weight, as in the case of vault-lights, it is necessary to support the several sections or the complete body through the middle. Again, it is highly important that the ribs should be arranged in such manner as to make it easy for the same to be cleaned and to leave as little as possible in the way of corners and obstructions to prevent cleaning. In other words, it is desirable to have each rib as nearly as possible continuous across the whole width of the body when completed. All these results and many more are well accomplished in my device, particularly when the same is applied to such prismatic window and vault lights as are illustrated in the accompanying drawings, wherein—

Figure 2:
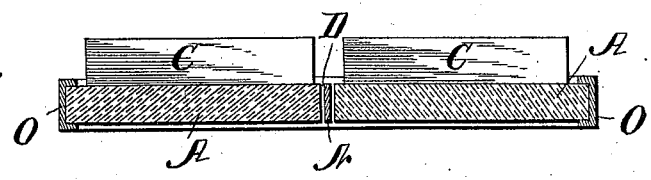
Figure 3:
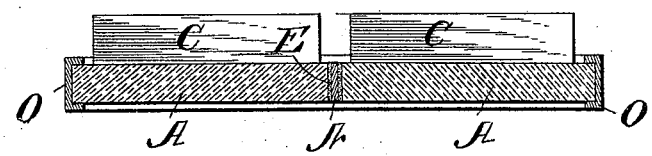
Figure 4:
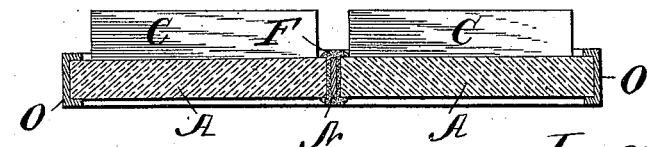
Figure 8:
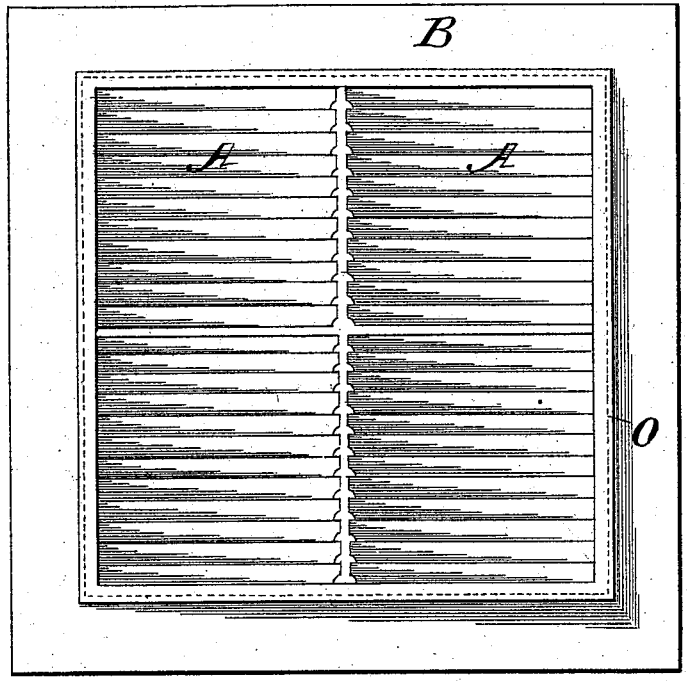
Figure 5:
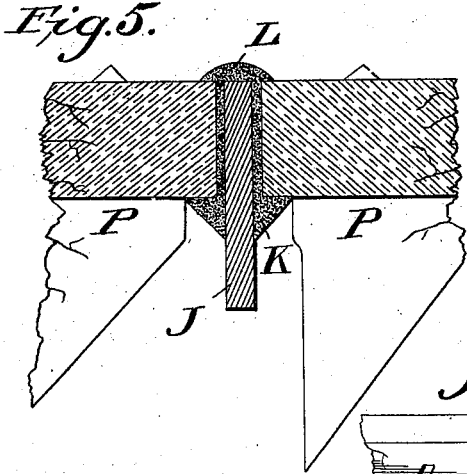
Figure 6:
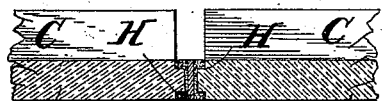
Figure 7:
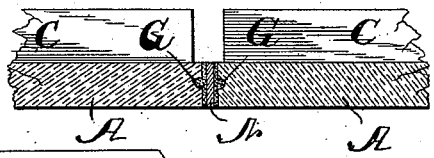
Figure 9:
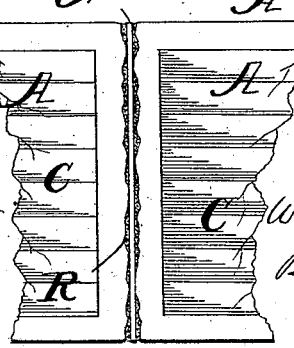

Figure 1 is a plan view of a series of prismatic window-lights laid in position on a table and in a frame. Fig. 2 is a cross-section on the line 2 2 of Fig. 1. Fig. 3 is the same as Fig. 2, with metal deposited between the tile and the strip. Fig. 4 is the same as Fig. 2, with metal deposited overhanging the surfaces of the sections. Figs. 5, 6, and 7 are detail cross-sections of modifications of connections. Fig. 8 is a plan view like Fig. 1, with the prismatic ribs extending entirely across the tile on which they are formed. Fig. 9 is an enlarged detail of a modification.

Like parts are indicated by the same letters in all the figures.

A A indicate the prismatic tiles.

O is a metallic frame, which may or may not be the permanent frame for the complete body of glass, though it is perhaps preferable to have this frame in which the glass is formed into the body permanent therewith.

B is a table on which the parts may be conveniently assembled.

C C are the prismatic ribs on the tile.

D D are the spaces which intervene between the strips and the tile-sections before the deposit is made.

E is the deposited metal between the strips and the edges of the sections.

F is the deposited metal overhanging the surfaces of the sections along their opposite edges.

G is a groove-like indentation in the edge of the tile.

H H are similar indentations differently placed.

J is a long and larger and heavier strip, having a heavy deposited mass K along its downwardly-projecting side and a mass of metal L about its upper edge.

P P are the heavy vault-light prismatic tiles associated with such rib J.

R indicates a mass of metal filings inserted between the strip and the edge of the tile-section under certain circumstances before the whole is exposed to the electrolytic bath.

I have not endeavored to give accurate proportions in the illustrations of the several parts above referred to, and they are to be taken as somewhat diagrammatic and illustrative rather than as proportional drawings.

I take a suitable table and place upon it the frame, it only being necessary to have such a frame as will hold the glass in position. I then lay the glass tile-sections on the table within the frame, the frame being of such size as to inclose the number of tile-sections desired to be brought together and so as to leave a slight slot or space between them. Into these slots or spaces the strips M and N are dropped, the intention being that they should fit the slots reserved for them, but leave spaces for electrodeposition. The table, with the glass and strip held in position thereon, is immersed in the electrolytic bath in such manner as not to disturb the relative position of frame, tile, and strips. The current is now applied. To make the application of the current entirely satisfactory, of course as close contact as possible should be made between the frame portions and the ends of the strips. The current now being applied the electrodeposition takes place, with the result of depositing metal on the surface of the strips between the glass, so as to completely seal and make the joint. At the same time a firm contact is made between the edges and the metal, so as to quite securely hold the tile together. In addition to this, and if, as in the preferred method, the deposit is continued there will be formed on the outside of the glass and upon the metal edge ledges which engage the glass, and thus form, as indicated in the drawings, a binding body of metal on each side. In the case of the vault-light shown in Fig. 5 the downwardly-projecting end of the strip may be covered with wax or the like to prevent electrodeposition, and upon this strip the finished glass body may rest for support. There may be as many of these strips as desired, varying in number and in strength, according to the circumstances of each case, the size of the total body of prismatic vault-lights, and the weight to be put on them. The grooves shown in Figs. 6 and 7 on the adjacent edges of the tile-sections are adapted to receive ribs on the strips, preferably formed by electrodeposition, and in this case the strips may or may not project beyond the surface of the tile. If they project, overhanging ledges, as in the other cases, may be formed.

By the use of the term "groove" here and elsewhere I mean generally to include such recesses or indentations in the face of one or more of the opposed tile-section edges as will serve to receive a body of greater or less size of electrodeposited metal, thus to bind the parts together and to a degree obviate what otherwise might be the necessity of the overhanging mass of electrodeposited metal F.

The strips or ribbons of metal placed between the tile-sections may be wider or narrower than the edges between which they are placed and of any desired thickness, the essential point being that each serves the primary purpose of a foundation cathode electrical conductor for the subsequent electrodeposit.

To facilitate the closing up of the space between the adjacent sections of tile, it may be necessary to introduce a metal or the like addition to the ribbons or strips, and I have therefore proposed, where the edges of the glass are somewhat irregular, so as to make the spaces between the tile-sections of varying width, to put into such spaces alongside of the ribbon when in position metal filings or finely-divided filling substances, which will serve, as soon as the electric process begins, to fill up the spaces rapidly at that point.

I do not desire to be limited in the application of my invention to the particular form of tiles used, as any sort of tile or glass can be employed in my invention.

The strips between the tiles are preferably of relatively strong metal separately formed and of sufficient strength to make a loose skeleton frame between which the tile-sections are to be received, and probably the preferred metal would be copper or its alloys. These strips are secured together at their crossing or intersecting points by the action of the electric current.

What I claim is—

1. The method of forming tile-sections into a body, which consists in bringing the several sections nearly together edge to edge, but with an open space between such edges, interposing a foundation cathode electrical conductor between such edges but so as still to leave a space to be filled between such edges, then subjecting the whole to the process of electrodeposition while the parts are in such position, and thus depositing a homogeneous mass of metal between the tile edges until the tile edges are permanently secured together by the engagement of the conductor and mass of deposited metal with each other and with the tile between the edges thereof.

2. The method of forming tile-sections into a body, which consists in bringing the several sections nearly together edge to edge, but with an open space between such edges, interposing a foundation cathode electrical conductor between such edges but so as still to leave a space to be filled between such edges, then subjecting the whole to the process of electrodeposition while the parts are in such position, and thus depositing a homogeneous mass of metal between the tile edges until the tile edges are permanently secured together by the engagement of the conductor and mass of deposited metal with each other and with the tile between the edges thereof, and continuing such electrodeposition until the mass of deposited metal is continued over upon the surface of such sections along such edges.

3. The method of forming tile-sections into a body, which consists in bringing the several sections nearly together edge to edge, but with an open space between such edges, interposing a foundation cathode electrical conductor comprising a loose skeleton frame of relatively strong material between such edges but so as still to leave a space to be filled between such edges, then subjecting the whole to the process of electrodeposition while the parts are in such position, and thus depositing a homogeneous mass of metal between the tile edges until the tile edges are permanently secured together by the engagement of the conductor and mass of deposited metal with each other and with the tile between the edges thereof.

4. The method of forming tile-sections into a body, which consists in bringing the several sections nearly together edge to edge, but with an open space between such edges, interposing a foundation cathode electrical conductor comprising a loose skeleton frame of relatively strong material between such edges but so as still to leave a space to be filled between such edges, then subjecting the whole to the process of electrodeposition while the parts are in such position, and thus depositing a homogeneous mass of metal between the tile edges until the tile edges are permanently secured together by the engagement of the conductor and mass of deposited metal with each other and with the tile between the edges thereof, and continuing such electrodeposition until the mass of deposited metal is continued over upon the surface of such sections along such edges.

5. The method of forming tile-sections into a body, which consists in bringing the several sections nearly together edge to edge, such opposed edges being provided with grooves, interposing a foundation cathode electrical conductor between such edges, then subjecting the whole to the process of electrodeposition while the parts are in such position and thus depositing a homogeneous mass of metal between the tile edges and within such grooves until the tile edges are permanently secured together by the engagement of the conductor and mass of deposited metal with each other and with the tile between the edges thereof and the walls of the groove.

6. The method of forming tile-sections into a body, which consists in bringing the several sections nearly together edge to edge, but with an open space between such edges, said sections provided with prismatic ribs which extend substantially across the section and form intermediate surface angles, interposing a foundation cathode electrical conductor between such edges, then subjecting the whole to the process of electrodeposition while the parts are in such position, and thus depositing a homogeneous mass of metal upon such conductor and within such surface angles adjacent to the edges where such conductor is interposed, until the tile edges are permanently secured together by the engagement of the conductor and mass of deposited metal with each other and with the tile-surfaces within such angles.

7. The method of forming tile-sections into a body, which consists in bringing the several sections nearly together edge to edge, but with an open space between such edges, interposing a foundation cathode electrical conductor between such edges, but so as still to leave a space to be filled between such edges, inserting within such spaces a finely-divided electrical conducting material, then subjecting the whole to the process of electrodeposition while the parts are in such position, and thus depositing a homogeneous mass of metal between the tile edges and in the midst of such finely-divided electrical conducting material until the tile edges are permanently secured together.

WILLIAM H. WINSLOW.

Witnesses:
DONALD M. CARTER,
BERTHA C. SIMS.